United States Patent [19]

Sayles

[11] Patent Number: 5,085,725
[45] Date of Patent: Feb. 4, 1992

[54] METHOD OF CHEMICAL BONDING OF SOLID PROPELLANT GRAINS TO THE INTERNAL INSULATION OF AN INTERCEPTOR MOTOR

[75] Inventor: David C. Sayles, Huntsville, Ala.

[73] Assignee: The United States of America as represented by the Secretary of the Army, Washington, D.C.

[21] Appl. No.: 564,897

[22] Filed: Aug. 6, 1990

[51] Int. Cl.$^5$ ............... C06B 45/00; C06D 5/00
[52] U.S. Cl. ................. 156/281; 60/253; 60/255; 102/287; 102/291; 156/307.3; 264/3.1; 428/420
[58] Field of Search ............ 264/3.1; 102/287, 293, 102/289, 291; 60/253, 255; 156/281, 307.3; 428/420

[56] References Cited

U.S. PATENT DOCUMENTS

| | | | |
|---|---|---|---|
| 3,212,256 | 10/1965 | Sampson | 60/255 |
| 3,507,114 | 4/1970 | Webb | 264/3.1 X |
| 3,541,195 | 11/1970 | Anderson et al. | |
| 3,716,604 | 2/1973 | Dehm | 264/3.1 |
| 3,813,308 | 5/1974 | Skidmore | 264/3.1 X |
| 4,042,441 | 8/1977 | Wasserman et al. | 264/3.1 X |
| 4,328,281 | 5/1982 | Wrightson | 428/420 X |
| 4,604,248 | 8/1986 | Dehm | 264/3.1 |

Primary Examiner—Michael W. Ball
Assistant Examiner—Jeff H. Aftergut
Attorney, Agent, or Firm—Freddie M. Bush

[57] ABSTRACT

The trimer of 1,6-hexanediisocyanate, which has the chemical name in accordance with (International Union of Pure and Applied Chemistry) (IUPAC) nomenclature of 7-aza-8-oxo-7[1-isocyanato-6-oxohexyl]pentadecanediisocyanate, is employed in a method of chemical bonding of solid propellant grains to the internal insulation of an interceptor motor. Both the propellant composition and the insulation are chemically reactive with the trimmer identified hereinabove. The method comprises providing a solid propellant rocket motor case having the internal insulation installed therein. Following degreasing of the insulation outer surface, the trimer identified hereinabove is spray coated onto the insulation, and the solid propellant composition is placed onto the trimer. A chemical bond is formed between the propellant and the trimer and the insulation to achieve the chemical bonding of an isocyanate curable solid propellant composition to the internal insulation. The insulation employed in the preferred embodiment is formulated with ethylene-propylene-diene monomer prepolymer, peroxide-cured, and plasticized with 9% dioctyl sebacate. The propellant composition is cast onto the spray coated insulation surface where the chemical insulation-to-polyisocyanate-to-propellant bond is achieved which shows superior tensile, shear, and peel strength when compared to conventional insulation-liner-propellant bonding by prior art.

3 Claims, 2 Drawing Sheets

METHOD OF CHEMICAL BONDING OF SOLID PROPELLANT GRAINS TO THE INTERNAL INSULATION OF AN INTERCEPTOR MOTOR

DEDICATORY CLAUSE

The invention described herein may be manufactured, used, and licensed by or for the Government for governmental purposes without the payment to me of any royalties thereon.

BACKGROUND OF THE INVENTION

The liner of a missile motor consists of a thin layer of a polymerizable material which serves as a bond between the propellant and insulation. It is most generally formulated to be similar to the binder of the propellant. The liner has proven necessary because the insulations, in use in rocket motors, have produced too weak a bond to the propellant, and if a separation were to take place between the propellant and insulation, a burn-around would occur producing a major increase in burning surface and overpressuring of the motor.

Compounding a liner is complicated. Its composition is generally related to the composition of the propellant. It has the same binder, crosslinking agent, etc. The major differences between liner and propellant are that the liner does not contain an oxidizer (ammonium perchlorate), aluminum or nitroamino explosive compounds. The liner is applied using a "sling" lining apparatus that applies the liner through centrifugal force from a spinning spray head. A desired viscosity and certain flow properties are required of the liner. These properties are achieved through the use of inert fillers having high specific surfaces, such as a carbon black, titanium dioxide, silicon dioxide, etc.

The description of a state-of-the-art liner process which has been used in the fabrication of the Pershing II reveals the complexities of a typical liner process. Installation of the Pershing liner consists of the following, and requires approximately 40 hours to complete the following step of this state-of-the-art process:

(a) The surface of the internal insulator is degreased;
(b) The insulator's surface is buffed, and again degreased;
(c) A primer coat is sprayed onto the buffed insulator's surface;
(d) A barrier coat is applied;
(e) The liner is sprayed onto the barrier coat;
(f) The liner is allowed to undergo polymerization to the B-stage; and,
(g) The propellant is cast onto the liner.

It is recognized that the cost to complete the above process steps is significant, and simplication or elimination of the process steps would offer additional advantages.

The elimination of the need for a conventional-type liner provides a major cost advantage in addition to the following advantages: no processing difficulties, long shelf-life, strong chemical bonding between propellant and insulation, low off-gassing, compatibility with propellants and insulations of different composition and simple application procedure.

SUMMARY OF THE INVENTION

A polyisocyanate which is the trimer of 1,6-hexanediisocyanate provides the means of bonding an isocyanate curable solid propellant grain in an interceptor motor to the internal insulation of the motor. This insulation is formulated of ethylene-propylene-diene monomer (EPDM) which is further described in Table I hereinbelow.

The conversion of 1,6-hexanediisocyanate into its trimer involves three steps. These are: (a) reaction of 1,6-hexanediisocyanate with water to form 1-amino-6hexaneisocyanate; (b) reaction of an additional molecule of 1,6-hexanediisocyanate with 1-amino-6-hexaneisocyanate to form 7-aza-8-oxo-1,6pentadecanediisocyanate; and, (c) reaction of 7-aza-8-oxo-1,6-pentadecanediisocyanate with another molecule of 1,6-hexanediisocyanate to form the triisocyanate whose chemical name, (according to the International Union of Pure and Applied Chemistry) is 7-aza-8-oxo-7[1-isocyanato-6-oxohexyl]-pentadecanediisocyanate. The chemical reactions which are involved in the synthesis of trimerized 1,6-hexanediisocyanate will be disclosed in detail hereinbelow; however, the summary reaction to produce the trimer of 1,6-hexanediisocyanate is as follows:

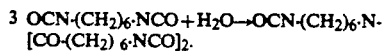

The trimer is prepared by a three step method set forth under Example I below under Description of the Preferred Embodiment(s).

The trimer of 1,6-hexanediisocyanate is employed in a 2 hour spray process following insulation degreasing, and a propellant composition is cast onto the spray coated insulation which chemically bonds the propellant composition to the internal insulation. The formulation of the insulation should be selected to be curable with the isocyanate or to be chemically reactive to form a chemical bond with the isocyanate. Likewise the cast propellant is reactive with the isocyanate to form a chemical bond therewith.

The trimer whose function and description is a set forth hereinabove is further identified by its chemical name, (according to the International Union of Pure and Applied Chemistry), (IUPAC)nonmenclai

DESCRIPTION OF THE PREFERRED EMBODIMENT(S)

EXAMPLE I

SYNTHESIS OF TRIMERIZED DIISOCYANATE OF 1,6-HEXANEDIISOCYANATE

STEP 1

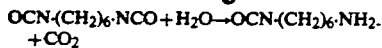

STEP 2

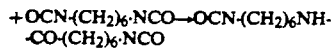

STEP 3

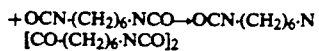

EXAMPLE II
SUMMARY REACTION

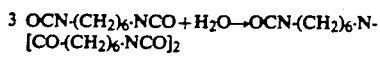

Figure 1:
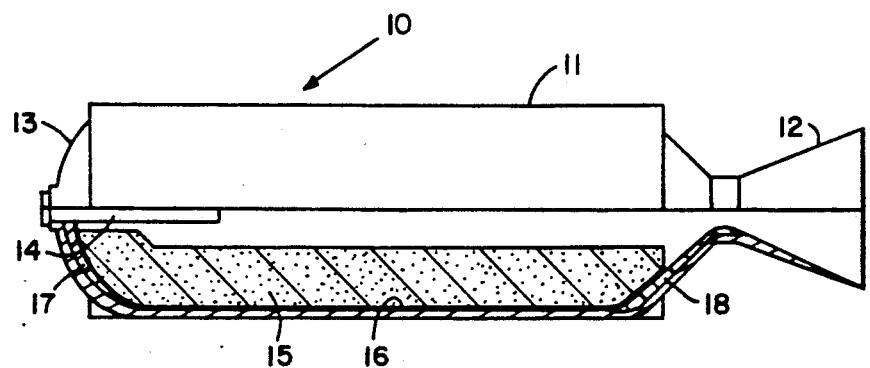
FIG. 1 depicts a cross-section of a simple missile motor.

In further reference to the Figures of the Drawings, FIG. 1 depicts a prior art rocket motor 10 in cross-sectional view to illustrate the location of the components of a simple missile motor having a rocket motor case 11 with a rocket nozzle 12 affixed at the aft end. At the head-end 13, also referred to as dome closure end of the rocket motor case, is shown the head-end insulation 17, and at aft-end is shown the aft-end insulation 18. An igniter 14 is shown positioned through the dome for igniting propellant 15 which is positioned next to liner 16 inside rocket motor case 11.

Figure 2:
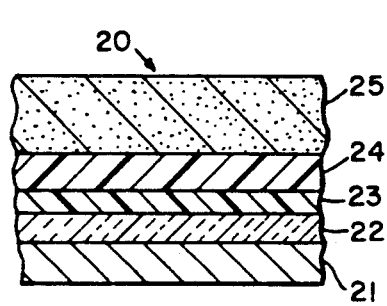
FIG. 2 shows a (Prior Art) state-of-the-art layup of the components of internal missile motor bond system.

FIG. 2 depicts the state-of-the-art (prior art) layup of the components 20 of an internal missile motor bond system wherein rocket motor case 21 has insulation 22 installed generally by hand lay up and curing to the rocket motor case 21. Between insulation 22 and liner 24 is an adhesive 23 for securing liner 24 securely to insulation. Alternately, prior cured insulation can be installed with an adhesive composition applied to the rocket motor case. Propellant 25 is generally cast next to the liner and cured in place.

Figure 3:
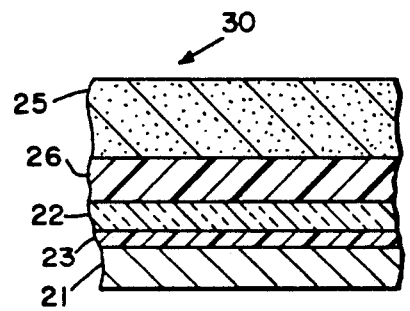
FIG. 3 shows the layup of the components of an internal missile motor bond system depicting the polyisocyanate bonding agent between the propellant and insulation.

FIG. 3 depicts a layup of the components 30 of an internal missile bond system wherein like numerals for similar components are employed as shown in FIG. 2 but wherein the polyisocyanate bonding agent 26 of this invention is employed between the propellant 25 and insulation 22 which is secured to rocket motor case with an adhesive 23.

Figure 4:
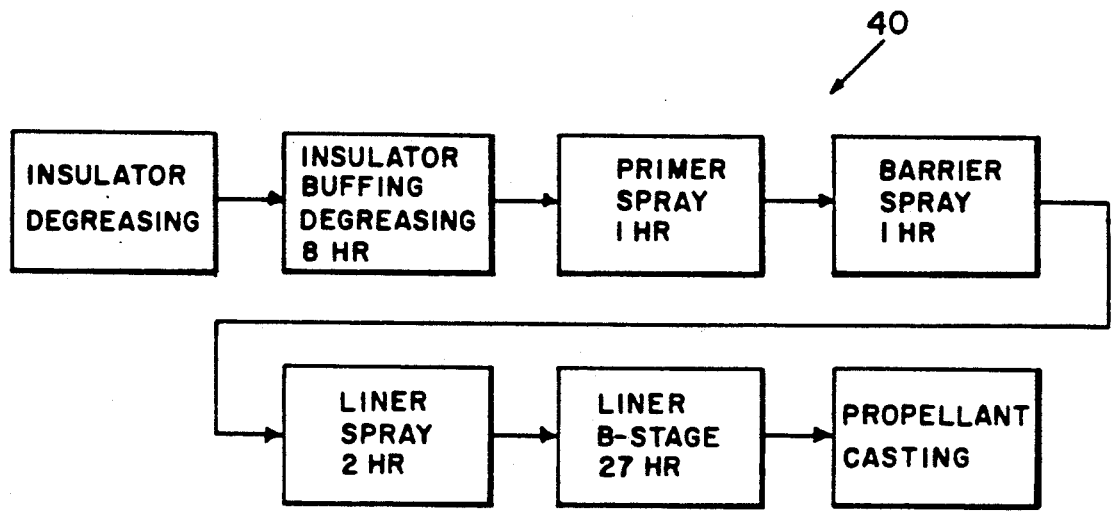
FIG. 4 shows a (Prior Art) current liner process of about 39 hours duration for a Pershing II type missile.

FIG. 4 depicts a (prior art) current liner process 40 which takes about 39 hours to complete.

Figure 5:
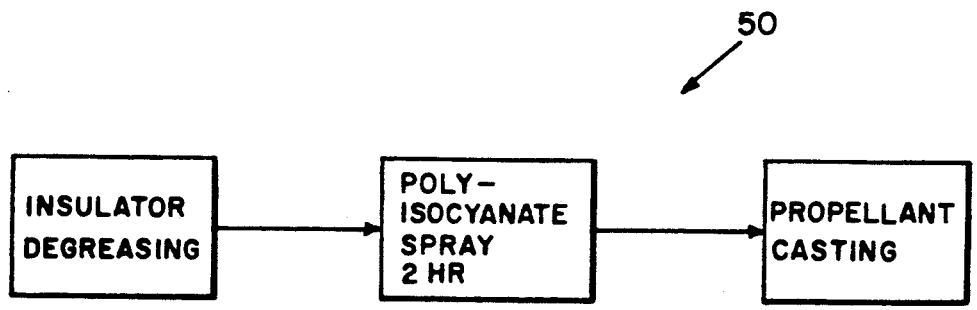
FIG. 5 shows the polyisocyanate process of this invention of about 2 hours duration for a Pershing II type missile.

FIG. 5 depicts the polyisocyanate process 50 of this invention which takes about 2 hours to complete the chemical bonding.

Figure 6:
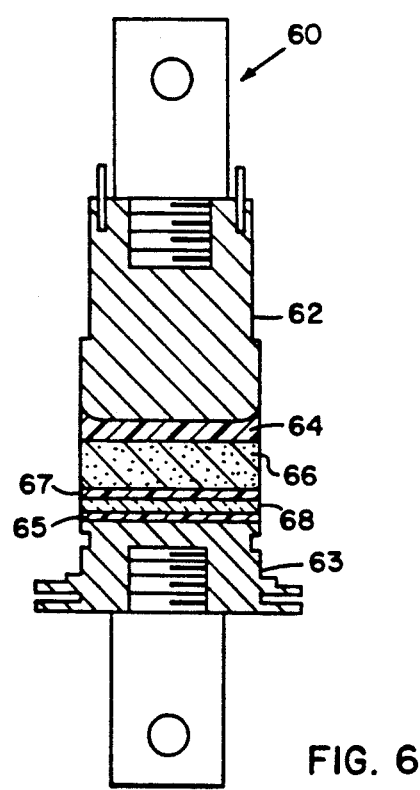
FIG. 6 depicts a test device for the assessment of complete internal missile motor bond system.

FIG. 6 depicts a test fixture device 60 for the assessment of complete internal missile motor bond system. This test fixture device comprises an upper test fixture member (metal) 62 and a lower test fixture member (metal) 63. Each test fixture member has outer opposing surfaces to which an adhesive 64 and 65 is applied to the upper and lower test fixture member respectively. Propellant 66 is secured to adhesive 64 and a liner 67 which interfaces between the propellant 66 and insulation 68 which is secured to lower test member 63. The test fixture device 60 of FIG. 6 is used to compare test specimens under constant load. The data for this comparison is set forth hereinbelow under "Comparison of Conventional Insulator-Liner and Chemical Casebond Characteristics." This data in Table I shows the improvement achieved by the chemical insulation-to-polyisocyanate-to-propellant bond, and comparisons of the test specimens under constant load are shown in Table II. The description and significance of the test procedures for the data determination on prepared samples precede Tables I and II hereinbelow.

The bond studies and bond evaluations are generally carried out by using tensile adhesion specimens and peel specimens. These specimens are tested in an Instron tester at a constant crosshead speed of 1-ipm. Test specimens of the complete bond systems were evaluated comparatively, and the results are presented in TABLE I. The results that were obtained pointed up the fact that the polyisocyanate bonding system was superior to the conventional state-of-the-art bonding system.

Another technique that can be used involves subjecting a composite sandwich, as depicted in FIGS. 2 and 3 to static test under a constant load. The test device is shown in FIG. 6. The specimens are made by fabricating a 2-inch diameter specimen from all of the materials and interfaces that would go into the preparation of the adhesive bond of the propellant to the motor case. The adhesive bond system, thus, consist of motor case, adhesive, insulation, primer, liner and propellant for the state-of-the-art system, and the chemical bond system consist of motor case, adhesive, insulation, polyisocyanate, and propellant. The specimens were fabricated so that they closely matched a plug which was cut from a missile motor. Triplicates were run for each specimen, and the comparisons were conducted side-by-side using increasing load weights. A 2-inch diameter plug of insulation was used, and the thicknesses of the components were the same as used in the Pershing II system.

TABLE 1
COMPARISON OF CONVENTIONAL INSULATOR[1] - LINER[2] AND CHEMICAL[3] CASEBOND CHARACTERISTICS

| TEST SPECIMEN | Tensile (psi)[4] 2-ipm[5] | Shear (psi) (200-ipm) | 90% Peel (pli)[6] (5-ipm) |
|---|---|---|---|
| Conventional insulation-to-liner-to-propellant bond | 174 | 127 | 37.2 |
| Chemical insulation-to-polyisocyanate-to-propellant bond | 190 | 154 | 41.7 |

[1] Plasticized ethylene-propylene-diene prepolymer, peroxide-cured and plastized with 9% dioctyl sebacate
[2] Hydroxyl-terminated polybutadiene incorporating 40% carbon black with isophorone diisocyanate as the crosslinking agent
[3] Trimerized 1,6-hexanediisocyanate
[4] Pounds per square inch
[5] Inches per minute
[6] Pounds per linear inch (1) Plasticized ethylene-propylene-diene prepolymer, peroxide-cured and plasticized with 9% dioctyl sebacate (2) Hydroxyl-terminated polybutadiene incorporating 40% carbon black with isophorone diisocyanate as the crosslinking agent (3) Trimerized 1,6-hexane diisocyanate (4) Pounds per square inch (5) Inches per minute (6) Pounds per linear inch

TABLE II

| | COMPARISON OF THE TEST SPECIMENS UNDER CONSTANT LOAD | | | |
|---|---|---|---|---|
| | LOAD WEIGHT (50 POUNDS) | | | |
| SPECIMEN | 3 Months | 6 Months | 9 Months | 12 Months |
| Conventional | + | + | − | |
| Polyisocyanate | + | + | + | − |

+ = Passed
− = Failed

It was determined that the polyisocyanate bond system was stronger than the conventional bond system.

I claim:

1. A method of chemical bonding an isocyanate curable solid propellant composition to the outer surface of the internal insulation of an interceptor solid rocket motor, said method comprising:

(i) providing a solid propellent rocket motor case having said internal insulation installed therein;

(ii) degreasing the outer surface of said insulation to yield a degreased insulation surface;

(iii) spraying said degreased insulation surface with the trimer of 1,6-hexanediisocyanate which is chemically reactive with said degreased insulation surface, said trimer of 1,6-hexanediisocyanate prepared by the process set forth under (a)-(c) below which comprises:

(a) reacting 1,6-hexanediisocyanate with water to form 1-amino-6-hexaneisocyanate;

(b) reacting said 1-amino-6-hexaneisocyanate with an additional molecule of 1,6-hexanediisocyanate to form 7-aza-8-oxo-1,6-pentadecanediisocyanate; and, (c) reacting said 7-aza-8-oxo-1,6-pentadecanediisocyanate with another molecule of 1,6-hexanediisocyanate to form the triisocyanate whose chemical name in accordance with the International Union of Pure and Applied Chemistry is 7-aza-8-oxo-7-pentadecanediisocyanate;

(iv) placing said solid propellant composition onto said trimer of 1,6-hexane diisocyanate which is chemically reactive with said solid propellant composition; and, (v) forming a chemical bond between said solid propellant composition and said insulation surface with said trimer of 1,6-hexanediisocyanate with which said solid propellant composition and said insulation chemically react to form a chemical bonding to thereby complete said method of chemical bonding said isocyanate curable solid propellant composition to said surface of said internal insulation of an interceptor solid rocket motor.

2. The method of chemical bonding an isocyanate curable solid propellant composition as defined in claim 1 wherein said internal insulation installed in said solid propellant rocket motor case is formulated with ethylene-propylene-diene monomer prepolymer, peroxide-cured, and plasticized with 9 weight percent dioctyl sebacate.

3. The method of chemical bonding an isocyanate curable solid propellant composition as defined in claim 2 wherein said placing of said isocyanate curable solid propellant composition onto said trimer is achieved by casting said isocyanate curable solid propellant composition onto said 7-aza-8-oxo-7-pentadecanediisocyanate.

* * * * *

UNITED STATES PATENT AND TRADEMARK OFFICE
CERTIFICATE OF CORRECTION

PATENT NO. : 5,085,725
DATED : February 4, 1992
INVENTOR(S) : David C. Sayles

It is certified that error appears in the above-identified patent and that said Letters Patent is hereby corrected as shown below:

Column 6, line 6, "7-aza-8-oxo-7-pentadecanediisocyanate" should be --7-aza-8-oxo-7[1-isocyanato-6-oxohexyl] "pentadecanediisocyanate--.

Signed and Sealed this

Seventeenth Day of August, 1993

Attest:

BRUCE LEHMAN

Attesting Officer     Commissioner of Patents and Trademarks